United States Patent [19]

Choquet

[11] Patent Number: 4,803,888
[45] Date of Patent: Feb. 14, 1989

[54] RESISTANCE WIRE TENSION MEASURING GAUGE

[76] Inventor: Pierre Choquet, 3433 Chemin Saint-Louis, Apt. 2, Ste-Foy Québec, Canada, G1W 1S1

[21] Appl. No.: 86,879

[22] Filed: Aug. 19, 1987

[51] Int. Cl.$^4$ .............................................. G01L 5/04
[52] U.S. Cl. .................................... 73/862.39; 73/775
[58] Field of Search ............... 73/862.39, 862.42, 775, 73/862.65; 338/6

[56] References Cited

U.S. PATENT DOCUMENTS 3,481,189 12/1969 Brennan et al. .................. 73/803 X
4,302,978 12/1981 Dykmans .............................. 73/828
4,402,229 9/1983 Byrne ................................. 73/862.39
4,411,162 10/1983 Valadier ............................ 73/862.65

FOREIGN PATENT DOCUMENTS 195662 5/1967 U.S.S.R. ............................ 73/862.65

Primary Examiner—Jerry W. Myracle

[57] ABSTRACT

An electrical resistance wire is mounted along a cable or a rod which can be subject to a tension load or strain. The wire is mounted so that it undergoes a variation of its resistance when there is a variation of the tension load in the cable or rod. The resistance in the resistance wire is measured on a periodic basis, which gives a measure of the tension load.

9 Claims, 3 Drawing Sheets

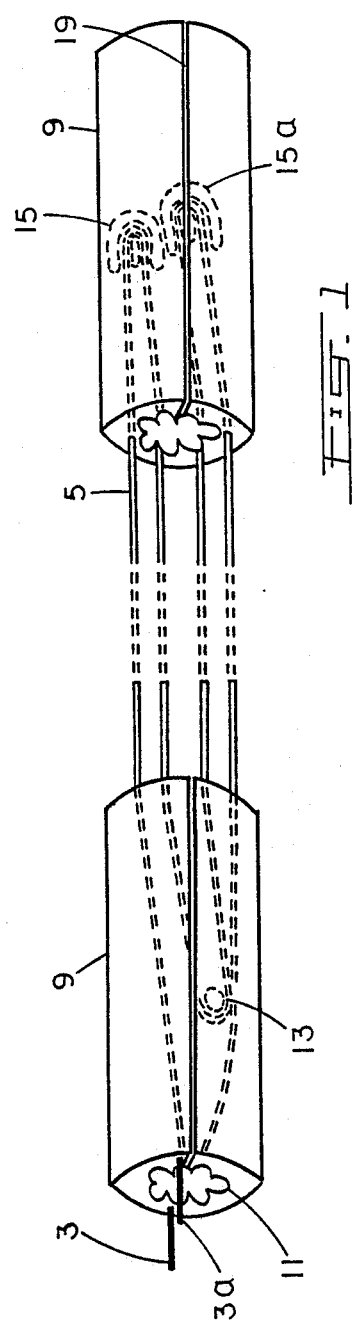
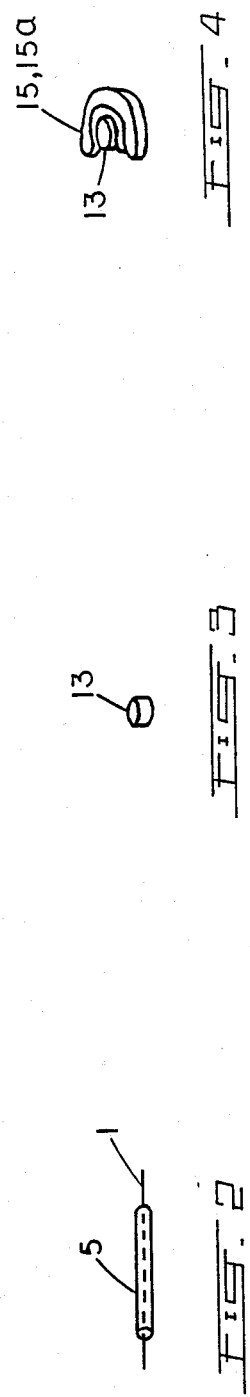

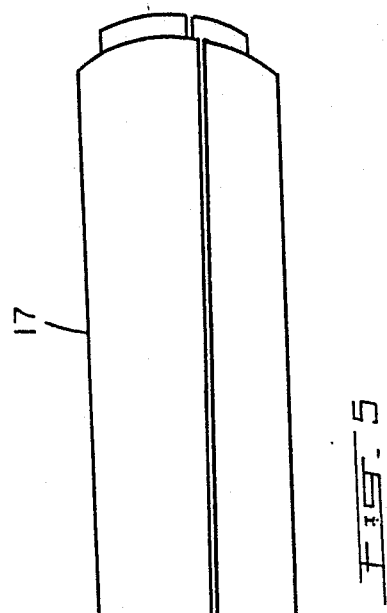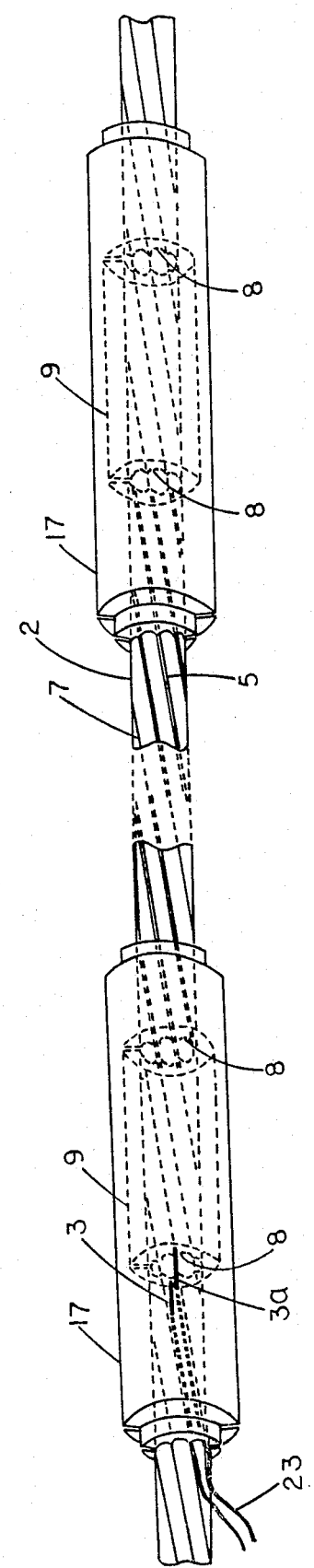

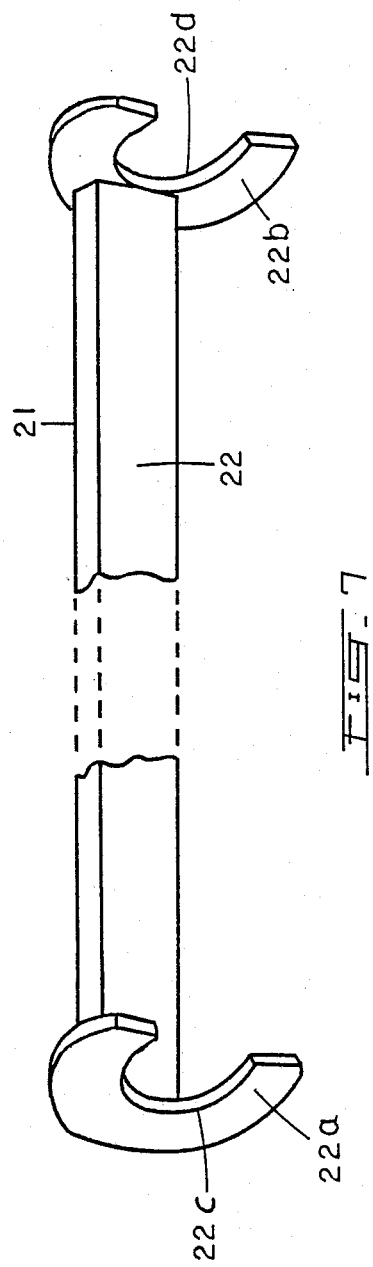

RESISTANCE WIRE TENSION MEASURING GAUGE

BACKGROUND OF THE INVENTION

1. Field of the Invention

This invention relates to an apparatus for measuring the tension load or the strain in a steel cable grouted in a borehole. More particularly, this invention relates to a low cost small size gauge to be attached to a steel cable. The gauge, which working principle is based on a resistance wire, is included in an electrical circuit for reading-out.

2. Description of the Prior Art

Steel cables, being either steel wire ropes or steel stranded cables, : have been used for a long time in reinforced and pre-stressed concrete in a variety of construction applications. More recently, the idea has emerged of using steel cables grouted in boreholes to reinforce rock masses and to ensure a better stability in situations such as road cuts, trenches, open pit and underground mines, or natural slopes nearby constructed areas. Typical steel cables often referred to as cable bolts when used in these latter applications, have a diameter ranging between 15 and 40 mm, a length varying between 5 to 50 m and are used in boreholes with a diameter between 45 and 90 mm. A grout which is usually a cement grout, a cement mortar or a chemical grout is pumped into the borehole after the cable has been pushed in.

Measuring tension in steel cables used either in a stand-alone application such as an elevator cable, a cable for a reel in deep-sea fishing, a cable in a mine hoist or a power line cable, or used in a combined application such as a reinforcement means in concrete structures is a rather common practice. Various apparatuses allowing for tension measurement are presently reported in patent literature, based on a variety of principles such as monitoring electrical parameters of a cable winding motor, inserting a piezo-element in the cable core heart, clamping a strain bridge to the cable, measuring the deflection of the cable under three point bending, bonding elements of different length and breaking strength on the cable measuring transverse vibrations induced by EM oscillators or finally using resistance strain gauge load cells. However, most of these systems cannot be used for the proposed application of measuring tension in a cable grouted in a small diameter borehole because their volume is too big which would impede subsequent proper injection of grout or require a too large and uneconomic borehole. Most of the systems already in existence are also very costly which does not encourage measurement of tension at a number of locations along the cable, whereas this practice is highly recommendable since it is well known that cables grouted in rock masses are tensioned rather locally because of the fractured nature of the rock. Also, in a natural rock mass, it is well recognized that loading of reinforcement cables is explained by one of the two following mechanisms: pure traction due to fracture opening or traction accompanied by shearing when some tangential movement is also taking place along the fractures. Most of the existing systems will give false readings in the event of shearing, whereas it is necessary that the principle on which the system would be based be independent of the mode of loading of the cable.

Finally, most of the existing systems were not designed for utilization on a grouted cable. It is therefore likely that movements of the cables due to a tension built-up will bring them in contact with the hardened grout and cause malfunctions.

SUMMARY OF THE INVENTION

In order to avoid the shortcomings of already existing apparatus for the measurement of tension in cables, I have invented a new apparatus, based on an electrical resistance wire winded along the cable, which change of resistance during elongation of the cable will be proportional to the tension load applied to it.

It is an object of the present invention to measure the value of the tension at various locations along the length of the steel cables in an area of reduced clearance, such as the borehole in which they are installed, and without being affected by the hardened grout surrounding the cable and the gauge.

Another object of the present invention is to provide an accurate evaluation of the tension in a cable grouted in a borehole.

Another object of the present invention is to provide an accurate evaluation of the tension in a freestanding cable or a steel rod as well.

Another object of the present invention is to provide an apparatus which can easily be modified to suit the shape of any existing cable, be it of wire rope type or stranded type.

Another object of the present invention is to provide an apparatus that will determine tension in a cable grouted in a borehole in a rock mass independently of the two modes of loading for these: pure traction or traction accompanied by shearing.

It is another object of the present invention to provide an apparatus which working principle is not affected by the hardened grout which surrounds it in the borehole.

Another object of the present invention is to provide an apparatus of very small size, typically with a diameter exceeding the cable's diameter by only 16 mm or less, in order not to impede proper injection of grout in boreholes of usual sizes.

It is another object of the present invention to provide a low cost apparatus suited for both long term and short term applications in cable loading evaluation.

Another object of the present invention is to provide an apparatus which will not be affected by exposure to water or humidity.

It is another object of the present invention to provide an apparatus which reading principle is compatible with automatic data logging technology and/or remote reading technology.

BRIEF DESCRIPTION OF THE DRAWINGS

These and other objects of the present invention and how they can be achieved, as well as a fuller understanding of my invention may be had by referring to the following description and claims taken in conjunction with the accompanying drawings in which:

FIG. 1 represents a view of the apparatus itself, showing the two end anchors and four wires in between, with dashed lines in the middle of the wires indicating continuity of them;

FIG. 2 represents an enlarged view of a portion of the wire;

FIG. 3 and 4 represent views of plastic pieces included in the end anchors;

FIG. 5 represents a view of the protective tubing for the end anchors.

FIG. 6 represents a view of the apparatus mounted on a seven strand cable.

FIG. 7 represents a view of a tensioning tool used during installation of the apparatus on a cable.

DESCRIPTION OF THE PREFERRED EMBODIMENTS

With reference to the drawings, an apparatus according to the invention is mainly illustrated in FIGS. 1 to 5. The apparatus is based on a thin electrical resistance wire 1 (in the present case 0.25 mm diameter although any other suitable value can be selected) terminated by two electrical connections 3 and 3a. The wire is protected by means of a rubber tube 5 and it is wound into the spiral grooves 7 (FIG. 6) between the strands of cable 2 (or of a wire strand if it is intended to be used on a wire rope) as shown in FIG. 6. A typical gauge uses 2.4 m of wire folded back three times for a total gauge length of 0.6 m and a resistance of 70 ohm. However, these figures could vary to a large extent depending on the specific gauges intended for new applications.

Each gauge is terminated at both ends thereof by a rubber anchor 9, the inner portion 8 thereof being moulded exactly to the shape of the cable 11 and to whcih is bonded by means of a quick setting glue (not shown). With reference to FIG. 1, it will be seen that these rubber anchors 9 include molded plastic wrapping pieces 13, 15 and 15a around which the wires 5 are wound back, which ensures a better rest for the wires 5 when the gauge is stretched during cable elongation. The end anchors 9 are each mounted inside a specially designed plastic tubing 17 (FIG. 5) which allows for a given movement of anchors during elongation of the cable and ensures adequate protection of the end anchors 9 against the hardened grout in the borehole. The tubing can also be sealed by any means known to those skilled in the art for water-proofing.

The gauge is installed on a cable 2 by opening the end anchors, which are provided with a slot 19 along their length and carefully winding the resistance wire in the grooves 7 between the strands 5 of a cable 2. A certain tension is then applied to the gauge by means of a tensioning tool 21 (FIG. 7) before bonding the anchors, in order to guarantee uniformity and accuracy of readings.

With reference to FIG. 7, it will be seen that the tensioning tool 21 comprises an extendable rod 22 and two horseshoe rests 22a, 22b, each being formed with respective openings 22c, 22d. For tensioning the gauge, it is merely necessary to mount the tool 21 with the openings 22c, 22d, over the cable 2, and the rests 22a, 22b adjoining a respective rubber anchor 9. The rod 22 is then extended until the rests 22a, 22b abut the two rubber anchors 9 and a proper tension is applied to the gauge via wire 5. Finally, the protective tubing 17 for the anchors are installed over them in known manner merely by opening same along slot 18, inserting the anchors 9 therein and reclosing the tubing 17.

After installation, the electrical wires 23 are connected in known manner to the electrical connections 3 and 3a, that run along the cable 5 to the borehole collar. Reading- out of the gauge is done by incorporating it in known manner in an electrical circuit where the gauge will act as one of the resistances of a standard Wheatstone bridge, one of the three others having the same resistance value as that of the gauge. Reading of voltage change between two ends of the Wheatstone bridge is proportional to the change in resistance of the resistance wire in the gauge, and thus to its elongation between the two end anchors. This principle is well known and used in reading-out of mechanical strain gauges. Consequently, prior calibration of a cable mounted with a gauge in a load frame will allow to convert voltage readings into tension load values or into strain values, whichever is read during the calibration test.

As a confirmation of the validity of the working principle of the gauge, a prototype similar to that of FIG. 1 was built and mounted on a free standing seven strand steel cable as represented in FIG. 6. The two ends of the cable were seized in the grips of a load frame and the cable was tensioned from 0 to 200 000 N, that is close to its yield limit. Reading-out of the gauge was performed on a high precision voltmeter connected to the electrical read-out circuit previously described. The following values were recorded:

TABLE 1

| Tension applied to cable (N) | Voltmeter read-out (millivolts) |
|---|---|
| 0 | 0 |
| 40,000 | 3 |
| 80,000 | 6.1 |
| 120,000 | 9.2 |
| 160,000 | 12.5 |
| 200,000 | 16.3 |

It can be observed on the above table that the voltmeter read-out is proportional to the tension load in the cable. The hysteresis behaviour was also verified by loading and unloading the cable and the behaviour of the gauge proved to be satisfactory.

A second traction test was performed on a similar cable mounted with a gauge and grouted with cement in a 51 mm diameter steel tube to simulate a cable grouted in a borehole in a rock mass. Readings recorded are presented below.

TABLE 2

| Tension applied to cable (N) | Voltmeter read-out (millivolts) |
|---|---|
| 0 | 0 |
| 40,000 | 2.8 |
| 80,000 | 5.5 |
| 120,000 | 8.7 |
| 160,000 | 11.2 |
| 200,000 | 14.8 |

It can again be observed that the voltmeter read-out is proportional to the tension load applied to the cable, which confirms that the gauge is suited for utilization in a small size borehole.

The sensitivity of the voltmeter used is one microvolt. Consequently, a variation in tension load of 12 N in a free standing cable or of 14 N in a cable grouted in a borehole can be assessed by the gauge and its read-out unit. In practice, the sensitivity of the system is more likely to be in a range between 50 and 100 N, which is extremely broad for the expected applications of the invention.

It should be noted that the wide range of the voltmeter read-out values recorded during the calibration tests suggests that the gauge could also be used on steel rods used for example in reinforced or prestressed concrete. Indeed, the 60 cm long 15.2 mm diameter seven strand steel cable used in the test showed an elongation of 21 mm when tensioned to 200,000 N, whereas a steel rod in the same length and diameter would show an elongation of approximately 1.2 mm at the same tension level. Consequently, with the same voltmeter used in the tests, the sensitivity of the gauge mounted on a steel rod would fall to a value seventeen times lower, however still satisfactory for most applications.

Finally, the gauge will show similar calibration values as those reported above for pure tensioning, when loaded in a tensioning and shearing pattern similar to that encountered at times in rock masses. This advantage will be due to the fact that the resistance wires are wound a number of times around the typical length of a cable on which the tensioning and shearing effect is mobilized. Consequently, some portions of the resistance wire will stretch more than others, but the average resistance change of the wire and the voltmeter read-out that will follow, are likely to be similar to those achieved in pure tensioning.

Since various modifications can be made to the invention hereinbefore described and illustrated in the accompanying drawings, and numerous variations may be made thereto without departing from the spirit and scope of the present invention, it is intended that the description and drawings are to be interpreted as illustrative only, and not in a limiting sense, and that only such limitations should be placed upon the invention as are specifically contained in the accompanying claims.

I claim:

1. An apparatus for measuring either tension load or strain in cables or rods comprising
   at least one resistance wire;
   said resistance wire being contained in a wrap around cover designed to protect said wire against aggressive agents;
   means for mounting said at least one resistance wire along said cable or rod so that said wire undergoes a variation of its electrical resistance when said cable or rod is subject to a variation of tension load or strain; and
   means to measure the variation in resistance in said wire so as to determine the tension load or strain of said cables or rods.

2. An apparatus according to claim 1, wherein said wrap around cover comprises a rubber tube and said resistance wire is firmly disposed inside said tube.

3. An apparatus according to claim 2, which comprises at least one anchoring means disposed along said cable or rod to provide a predetermined tension load or strain in said resistance wire.

4. An apparatus according to claim 2, which comprises at least first and second anchoring means spacedly mounted over said cable or rod, said resistance wire extending from said first anchoring means to said second anchoring means.

5. An apparatus according to claim 4, which comprises winding members provided inside said at least first and second anchoring means, said resistance wire being wound around said winding members back and forth between said first and second anchoring means.

6. An apparatus according to claim 5 which comprises a first and a second electrical connection mounted on said first anchoring means, said resistance wire having one end connected to said first electrical connection, the other end being connected to said second electrical connection, and means to measure voltage in said resistance wire connected to said first and second electrical connections.

7. An apparatus according to claim 6, wherein said resistance wire extends from said first connection to a first winding member provided in said second anchoring means, from which it returns to said first anchoring means around a second winding member provided therein, where it returns to said second anchoring means around a third winding member provided therein, said resistance wire then extending back to said first anchoring means where it is connected to said second electrical connection.

8. An apparatus according to claim 7, which comprises a plastic tubing covering each said anchoring means, said plastic tubing allowing said anchoring means to slide therein during elongation of the cable and ensuring protection of said anchoring means against aggressive agents.

9. An apparatus according to claim 8, in combination with an extendable tensioning tool to be disposed between said first and second anchoring means to induce a predetermined tension of said resistance wire upon extension of said tensioning tool.

* * * * *